US012694652B2

(12) United States Patent
Pati et al.

(10) Patent No.: US 12,694,652 B2
(45) Date of Patent: Jul. 28, 2026

(54) SYNTHETIC POSITIVE IMAGE GENERATION FOR FINE GRAIN IMAGE SIMILARITY BASED APPAREL SEARCH

(71) Applicant: Tata Consultancy Services Limited, Mumbai (IN)

(72) Inventors: Biswanath Pati, Bhubaneswar (IN); Rahul Das, Kolkata (IN); Aravind Selvaraj, Chennai (IN); Jayanta Mukherjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 251 days.

(21) Appl. No.: 18/599,569

(22) Filed: Mar. 8, 2024

(65) Prior Publication Data

US 2024/0312190 A1 Sep. 19, 2024

(30) Foreign Application Priority Data

Mar. 17, 2023 (IN) ............................. 202321018298

(51) Int. Cl.
| | |
|---|---|
| *G06V 10/774* | (2022.01) |
| *G06Q 10/0631* | (2023.01) |
| *G06Q 10/087* | (2023.01) |
| *G06V 10/74* | (2022.01) |

(52) U.S. Cl.
CPC ..... *G06V 10/774* (2022.01); *G06Q 10/06315* (2013.01); *G06Q 10/087* (2013.01); *G06V 10/761* (2022.01)

(58) Field of Classification Search
None
See application file for complete search history.

(56) References Cited

U.S. PATENT DOCUMENTS

| | | | | |
|---|---|---|---|---|
| 8,068,676 | B2 * | 11/2011 | Zhang ................ | G06Q 30/0631 |
| | | | | 705/26.7 |
| 10,452,954 | B2 * | 10/2019 | Schroff ................ | G06V 10/774 |
| 11,080,918 | B2 * | 8/2021 | Chen ........................ | G06F 40/20 |

(Continued)

OTHER PUBLICATIONS

Shankar et al., "Deep Learning based Large Scale Visual Recommendation and Search for E-Commerce," (2017).

(Continued)

*Primary Examiner* — Tahmina N Ansari
(74) *Attorney, Agent, or Firm* — FINNEGAN, HENDERSON, FARABOW, GARRETT & DUNNER LLP

(57) ABSTRACT

In apparel search context, process of finding a similar item out of thousands of other items is a cumbersome and computationally heavy process. In order to build a deep learning model that can perform the similarity search, hundreds of training images per Stock Keeping Unit (SKU) are required. Due to shortage of training data, this approach fails to generate a deep learning model that can perform the similarity search in intended manner. The existing approaches may also require domain experts to perform classification of apparels, so as to generate the training data. The method and system disclosed herein provide an approach in which positive images and negative images are generated from each query image, which in turn are used for generating a training data. The training data is then used to generate a deep learning model, which is used to perform the similarity search.

16 Claims, 11 Drawing Sheets

(56)     References Cited

U.S. PATENT DOCUMENTS

| | | | | |
|---|---|---|---|---|
| 11,222,061 | B2 * | 1/2022 | Zhao | H04N 21/4668 |
| 12,307,420 | B2 * | 5/2025 | Mukherjee | G06Q 10/087 |
| 2009/0116698 | A1 * | 5/2009 | Zhang | G06Q 30/0601 |
| | | | | 345/581 |
| 2020/0311120 | A1 * | 10/2020 | Zhao | H04N 21/4668 |
| 2020/0320769 | A1 * | 10/2020 | Chen | G06N 3/0464 |
| 2022/0391433 | A1 * | 12/2022 | Maheshwari | G06V 10/426 |
| 2023/0410038 | A1 * | 12/2023 | Mukherjee | G06Q 10/087 |
| 2024/0312190 | A1 * | 9/2024 | Pati | G06V 10/761 |
| 2025/0061687 | A1 * | 2/2025 | Gliga | G06V 10/761 |

OTHER PUBLICATIONS

Subedi et al., "Feature Learning-Based Generative Adversarial Network Data Augmentation for Class-Based Few-Shot Learning," Hindawi, Mathematical Problems in Engineering, (2022).

* cited by examiner

100

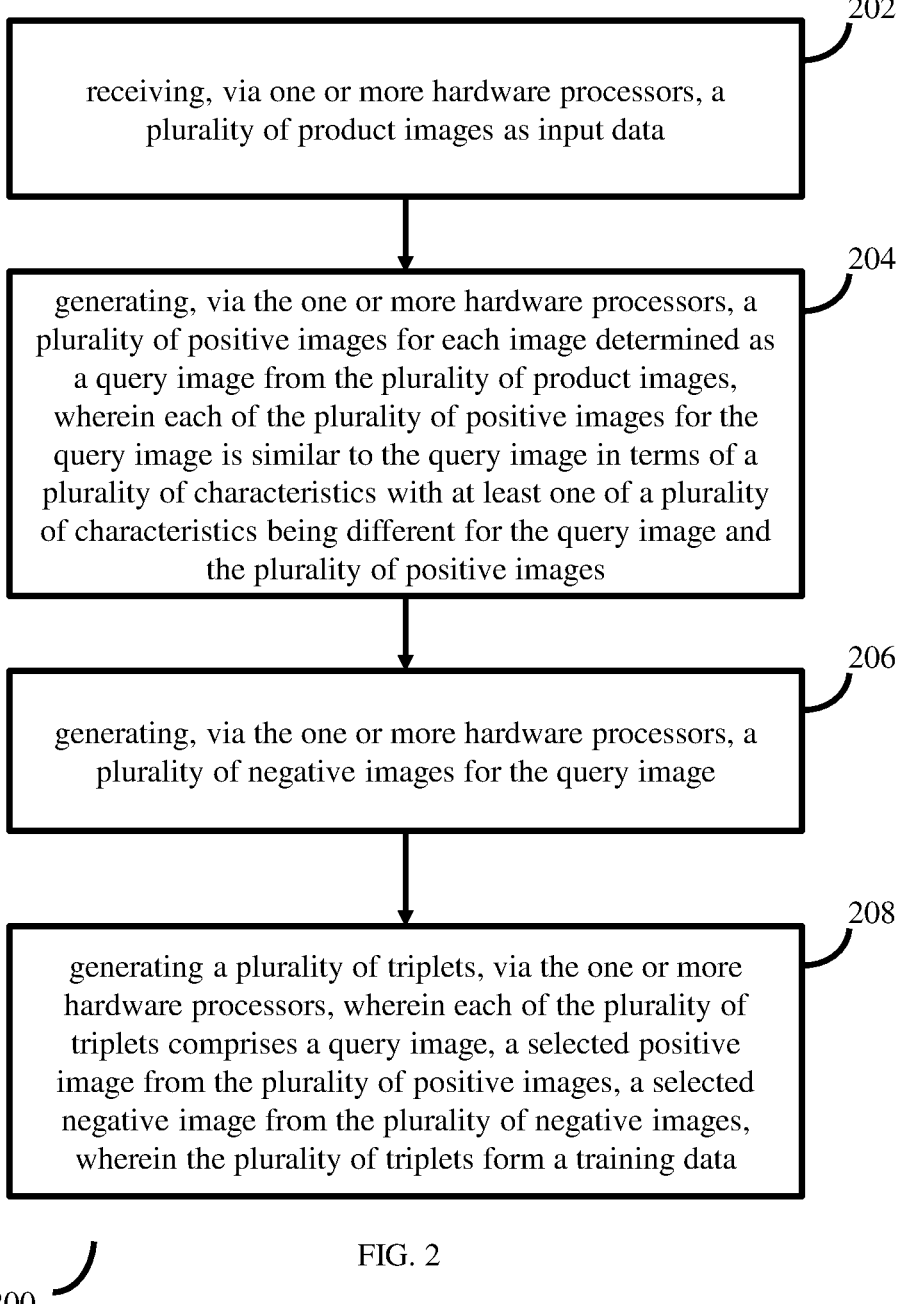

202 receiving, via one or more hardware processors, a plurality of product images as input data

204 generating, via the one or more hardware processors, a plurality of positive images for each image determined as a query image from the plurality of product images, wherein each of the plurality of positive images for the query image is similar to the query image in terms of a plurality of characteristics with at least one of a plurality of characteristics being different for the query image and the plurality of positive images

206 generating, via the one or more hardware processors, a plurality of negative images for the query image

208 generating a plurality of triplets, via the one or more hardware processors, wherein each of the plurality of triplets comprises a query image, a selected positive image from the plurality of positive images, a selected negative image from the plurality of negative images, wherein the plurality of triplets form a training data

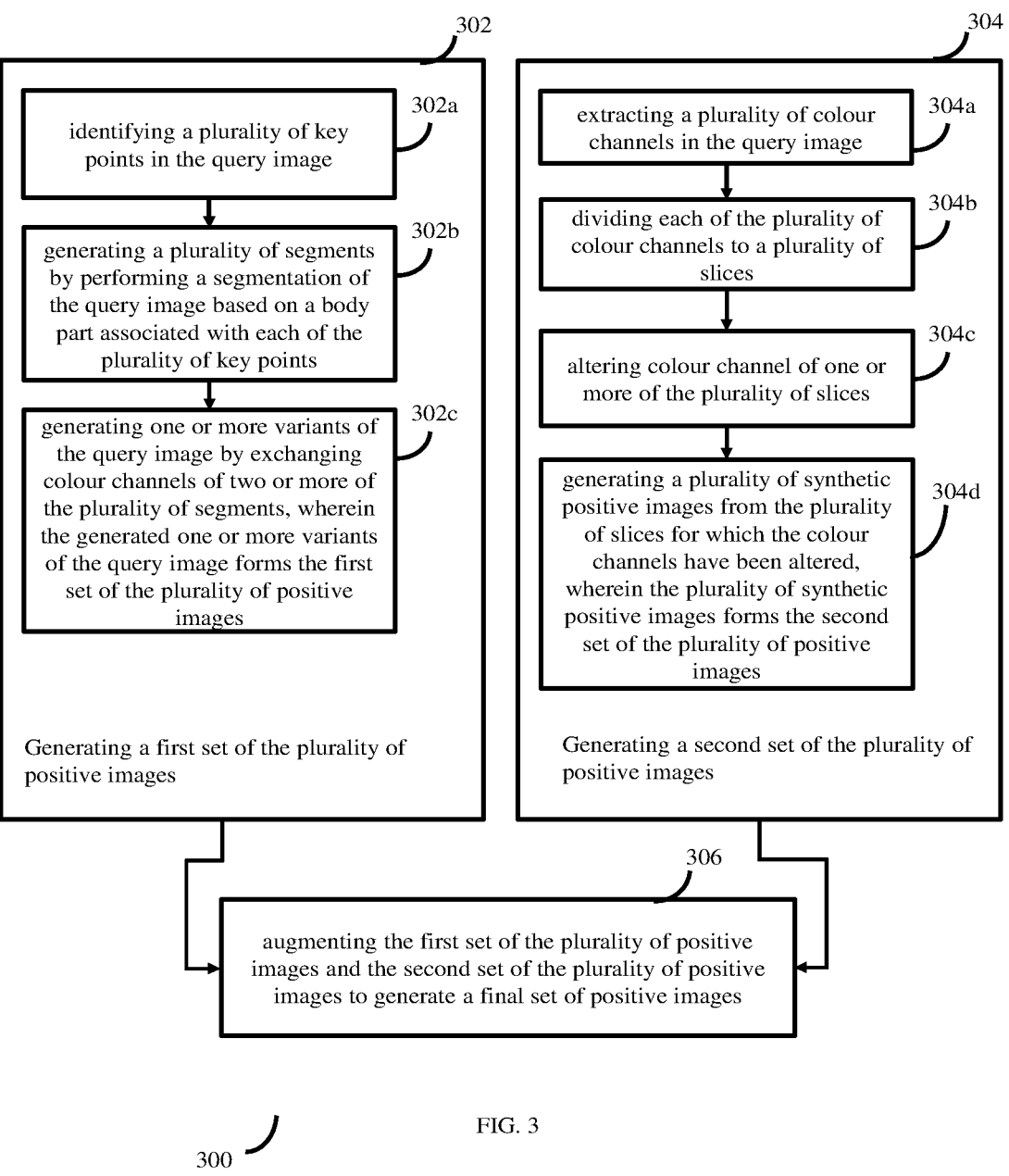

302

302a
identifying a plurality of key points in the query image 302b
generating a plurality of segments by performing a segmentation of the query image based on a body part associated with each of the plurality of key points 302c
generating one or more variants of the query image by exchanging colour channels of two or more of the plurality of segments, wherein the generated one or more variants of the query image forms the first set of the plurality of positive images Generating a first set of the plurality of positive images

304

304a
extracting a plurality of colour channels in the query image 304b
dividing each of the plurality of colour channels to a plurality of slices 304c
altering colour channel of one or more of the plurality of slices 304d
generating a plurality of synthetic positive images from the plurality of slices for which the colour channels have been altered, wherein the plurality of synthetic positive images forms the second set of the plurality of positive images Generating a second set of the plurality of positive images 306
augmenting the first set of the plurality of positive images and the second set of the plurality of positive images to generate a final set of positive images

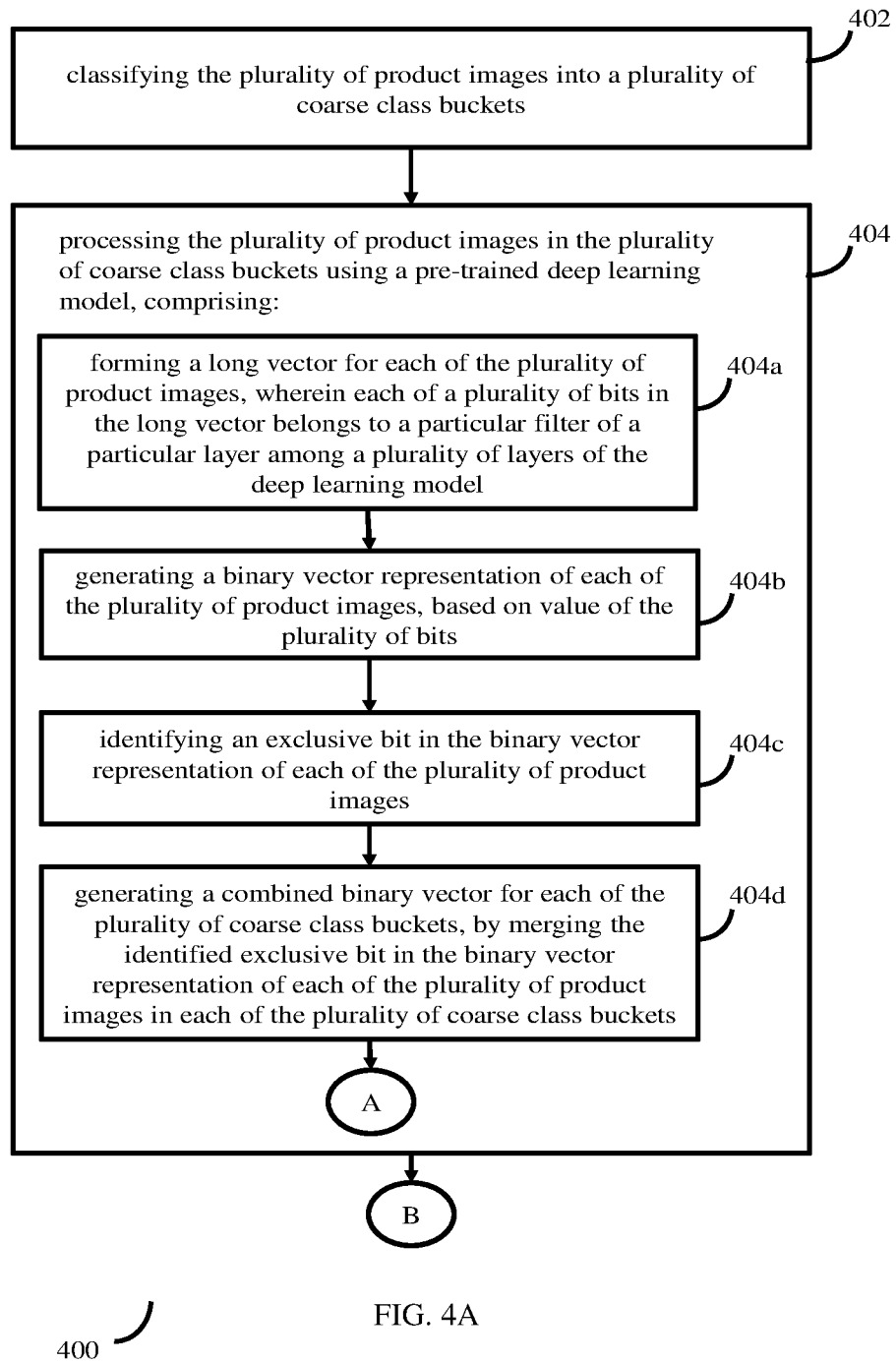

402 classifying the plurality of product images into a plurality of coarse class buckets

404 processing the plurality of product images in the plurality of coarse class buckets using a pre-trained deep learning model, comprising:

404a forming a long vector for each of the plurality of product images, wherein each of a plurality of bits in the long vector belongs to a particular filter of a particular layer among a plurality of layers of the deep learning model 404b generating a binary vector representation of each of the plurality of product images, based on value of the plurality of bits 404c identifying an exclusive bit in the binary vector representation of each of the plurality of product images 404d generating a combined binary vector for each of the plurality of coarse class buckets, by merging the identified exclusive bit in the binary vector representation of each of the plurality of product images in each of the plurality of coarse class buckets

400 comparing the similarity score of each of the plurality of images with a threshold of similarity

502 identifying all images from the plurality of images, having value of the similarity score below the threshold of similarity, as the plurality of negative images (in-class and out-of-class)

504

500

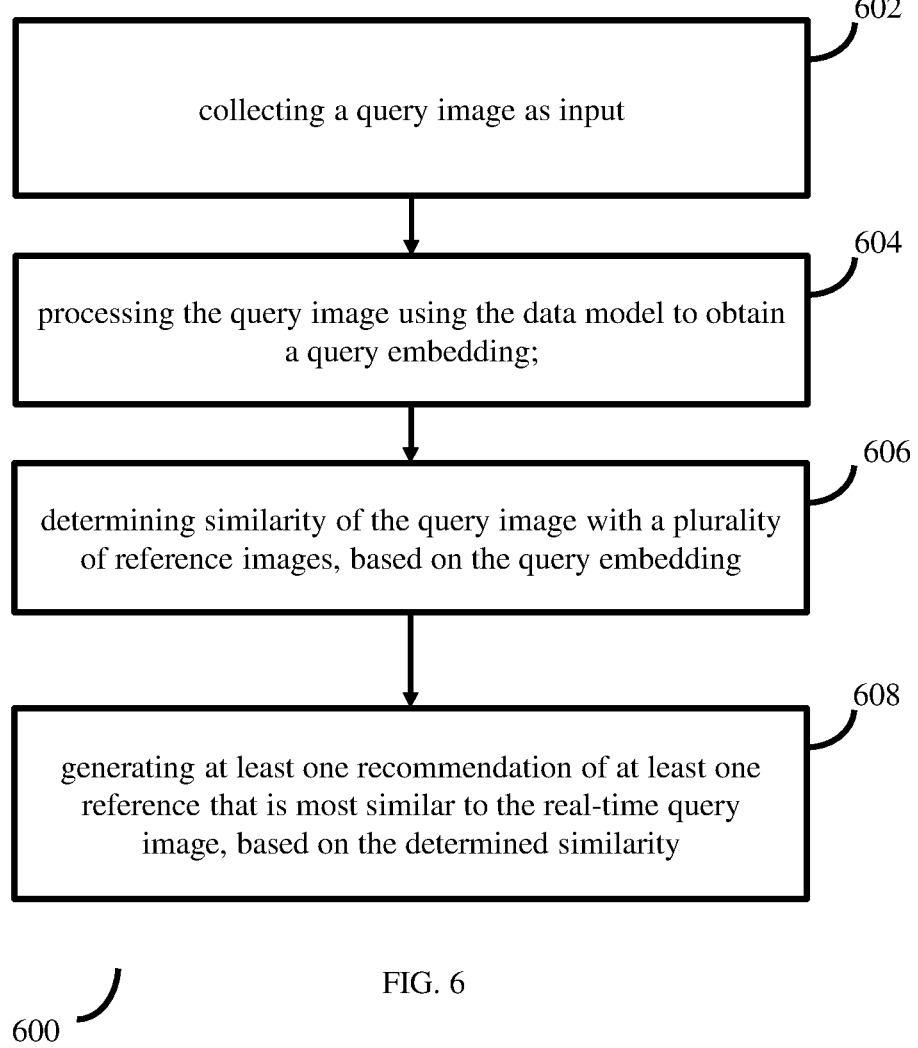

collecting a query image as input
602 processing the query image using the data model to obtain a query embedding;
604 determining similarity of the query image with a plurality of reference images, based on the query embedding
606 generating at least one recommendation of at least one reference that is most similar to the real-time query image, based on the determined similarity
608

SYNTHETIC POSITIVE IMAGE GENERATION FOR FINE GRAIN IMAGE SIMILARITY BASED APPAREL SEARCH

PRIORITY CLAIM

This U.S. patent application claims priority under 35 U.S.C. § 119 to: Indian Patent Application No. 202321018298, filed on Mar. 17, 2023. The entire contents of the aforementioned application are incorporated herein by reference.

TECHNICAL FIELD

The disclosure herein generally relates to apparel search, and, more particularly, to a system and method for synthetic positive image generation for fine grain image similarity based apparel search.

BACKGROUND

Global fashion ecommerce is approximately 700bl$ industry at present. With the industry having a strong online presence, and with more and more customers searching online for apparels, it is important that the users are given appropriate suggestions/search results, which would aid in decision making, which in turn may aid in business. One such feature is similarity search, which allows users to search for apparels of their choice. However, the similarity search in fashion industry is a big challenge. Whenever a customer browses for an apparel, an intelligent Ecommerce site should show the user the similar items in which the customer may be interested in. Similarity search has another applicability. The vendors may also like to use this system to check if they have already a particular pattern dress in their inventory when a new summer collection is launched. Using similarity search we can find the distance matrix to measure how similar or dis-similar a dress is vis-vis any other dress in the store.

The process of finding a similar item out of thousands of other items is a cumbersome, resource intensive, and computationally heavy process. In order to build a deep learning model that can perform the similarity search, hundreds of training images per Stock Keeping Unit (SKU) are required. Due to shortage of training data, this approach fails to generate a deep learning model that can perform the similarity search in intended manner. The existing approaches may also require domain experts to perform classification of apparels, so as to generate the training data, which maybe prone to error.

SUMMARY

Embodiments of the present disclosure present technological improvements as solutions to one or more of the above-mentioned technical problems recognized by the inventors in conventional systems. For example, in one embodiment, a processor implemented method is provided. In this method, a plurality of product images is received via one or more hardware processors as input data. Further, a plurality of positive images is generated via the one or more hardware processors, for each image determined as a query image from the plurality of product images, wherein each of the plurality of positive images for the query image is similar to the query image in terms of a plurality of characteristics with at least one of a plurality of characteristics being different for the query image and the plurality of positive images. Further, a plurality of negative images is generated via the one or more hardware processors, for the query image. Further, a plurality of triplets are generated via the one or more hardware processors, wherein each of the plurality of triplets comprises a query image, a selected positive image from the plurality of positive images, a selected negative image from the plurality of negative images, wherein the plurality of triplets form a training data.

In an embodiment, generating the plurality of positive images includes the following steps. Initially, a first set of the plurality of positive images is generated. Generating the plurality of positive images includes the following steps. Initially, a plurality of key points in the query image are identified. Further, a plurality of segments are generated by performing a segmentation of the query image based on a body part associated with each of the plurality of key points. Further, one or more variants of the query image are generated by exchanging color channels of two or more of the plurality of segments, wherein the generated one or more variants of the query image forms the first set of the plurality of positive images. Further, a second set of the plurality of positive images is generated. In this process, a plurality of color channels in the query image are extracted. Further, each of the plurality of color channels is divided to a plurality of slices. Further, color channel of one or more of the plurality of slices is altered. Further, a plurality of synthetic positive images are generated from the plurality of slices for which the color channels have been altered/manipulated, wherein the plurality of synthetic positive images forms the second set of the plurality of positive images. Further, the first set of the plurality of positive images and the second set of the plurality of positive images are augmented to generate a final set of positive images.

In another embodiment, generating the plurality of negative images includes the following steps. Initially, the plurality of product images are classified into a plurality of coarse class buckets. Further, the plurality of product images in the plurality of coarse class buckets are processed using a pre-trained deep learning model. Processing the plurality of product images using the pre-trained deep learning model includes the following steps. In this process, initially a long vector is formed for each of the plurality of product images, wherein each of a plurality of bits in the long vector belongs to a particular filter of a particular layer among a plurality of layers of the deep learning model. Further, a binary vector representation of each of the plurality of product images is generated based on value of the plurality of bits. Further, an exclusive bit in the binary vector representation of each of the plurality of product images is identified. Further, a combined binary vector is generated for each of the plurality of coarse class buckets, by merging the identified exclusive bit in the binary vector representation of each of the plurality of product images in each of the plurality of coarse class buckets. Further, a layer-wise filter index dictionary is generated using the combined binary vector for the plurality of coarse class buckets, wherein the layer-wise filter index dictionary holds information on a subset of the plurality of layers of the deep learning model, that have a significant role in distinguishing the plurality of images belonging to the plurality of coarse class buckets. Further, a distinguisher vector is generated for each of the plurality of product images, based on the layer-wise filter index dictionary. Further, a similarity score representing similarity of the plurality of images is determined in each of the plurality of coarse class buckets, based on the distinguisher vector for each of the plurality of product images, wherein, based on the determined similarity score, a plurality of the images from the plurality of coarse class buckets are identified as the plurality of negative images (in-class negative images).

In yet another embodiment, the plurality of images are identified as the plurality of negative images, based on the determined similarity score, using the following steps. Initially, the similarity score of each of the plurality of images is compared with a threshold of similarity. Further, all images from the plurality of images, having value of the similarity score below the threshold of similarity, are identified as the plurality of negative images.

In yet another embodiment, the method involves using a deep learning model trained using the generated training data to perform a similarity search. In an embodiment, the method may involve use of out-of-class images along with the in-class negative images, for training the deep learning model. In this process, a query image is collected as input. Further, the query image is processed using the deep learning model to obtain a query embedding. Further, similarity of the query image with a plurality of reference images is determined, based on the query embedding. Further, at least one recommendation of at least one reference that is most similar to the real-time query image, is generated, based on the determined similarity.

In yet another embodiment, a system is provided. The system includes one or more hardware processors, a communication interface, and a memory storing a plurality of instructions. The plurality of instructions when executed, cause the one or more hardware processors to receive a plurality of product images as input data. Further, a plurality of positive images is generated via the one or more hardware processors, for each image determined as a query image from the plurality of product images, wherein each of the plurality of positive images for the query image is similar to the query image in terms of a plurality of characteristics with at least one of a plurality of characteristics being different for the query image and the plurality of positive images. Further, a plurality of negative images is generated via the one or more hardware processors, for the query image. Further, a plurality of triplets are generated via the one or more hardware processors, wherein each of the plurality of triplets comprises a query image, a selected positive image from the plurality of positive images, a selected negative image from the plurality of negative images, wherein the plurality of triplets form a training data.

In yet another embodiment, the system generates the plurality of positive images by executing the following steps. Initially, a first set of the plurality of positive images is generated. Generating the plurality of positive images includes the following steps. Initially, a plurality of key points in the query image are identified. Further, a plurality of segments are generated by performing a segmentation of the query image based on a body part associated with each of the plurality of key points. Further, one or more variants of the query image are generated by exchanging color channels of two or more of the plurality of segments, wherein the generated one or more variants of the query image forms the first set of the plurality of positive images. Further, a second set of the plurality of positive images is generated. In this process, a plurality of color channels in the query image are extracted. Further, each of the plurality of color channels is divided to a plurality of slices. Further, color channel of one or more of the plurality of slices is altered. Further, a plurality of synthetic positive images are generated from the plurality of slices for which the color channels have been altered, wherein the plurality of synthetic positive images forms the second set of the plurality of positive images. Further, the first set of the plurality of positive images and the second set of the plurality of positive images are augmented to generate a final set of positive images.

In yet another embodiment, the system generates the plurality of negative images using the following steps. Initially, the plurality of product images are classified into a plurality of coarse class buckets. Further, the plurality of product images in the plurality of coarse class buckets are processed using a pre-trained deep learning model. Processing the plurality of product images using the pre-trained deep learning model includes the following steps. In this process, initially a long vector is formed for each of the plurality of product images, wherein each of a plurality of bits in the long vector belongs to a particular filter of a particular layer among a plurality of layers of the deep learning model. Further, a binary vector representation of each of the plurality of product images is generated based on value of the plurality of bits. Further, an exclusive bit in the binary vector representation of each of the plurality of product images is identified. Further, a combined binary vector is generated for each of the plurality of coarse class buckets, by merging the identified exclusive bit in the binary vector representation of each of the plurality of product images in each of the plurality of coarse class buckets. Further, a layer-wise filter index dictionary is generated using the combined binary vector for the plurality of coarse class buckets, wherein the layer-wise filter index dictionary holds information on a subset of the plurality of layers of the deep learning model, that have a significant role in distinguishing the plurality of images belonging to the plurality of coarse class buckets. Further, a distinguisher vector is generated for each of the plurality of product images, based on the layer-wise filter index dictionary. Further, a similarity score representing similarity of the plurality of images is determined in each of the plurality of coarse class buckets, based on the distinguisher vector for each of the plurality of product images, wherein, based on the determined similarity score, a plurality of the images from the plurality of coarse class buckets are identified as the plurality of negative images (in-class negative images).

In yet another embodiment, the system identifies the plurality of images as the plurality of negative images, based on the determined similarity score, using the following steps. Initially, the similarity score of each of the plurality of images is compared with a threshold of similarity. Further, all images from the plurality of images, having value of the similarity score below the threshold of similarity, are identified as the plurality of negative images.

In yet another embodiment, the system performs a similarity search using a deep learning model trained using the generated training data. In an embodiment, the system may be configured to use out-of-class images along with the in-class negative images, for training the deep learning model. In this process, a query image is collected as input. Further, the query image is processed using the deep learning model to obtain a query embedding. Further, similarity of the query image with a plurality of reference images is determined, based on the query embedding. Further, at least one recommendation of at least one reference that is most similar to the real-time query image, is generated, based on the determined similarity.

In yet another aspect, a non-transitory computer readable medium is provided. The non-transitory computer readable medium includes a plurality of instructions, which when executed, causes one or more hardware processors to perform the following steps. Initially, a plurality of product images is received via the one or more hardware processors as input data. Further, a plurality of positive images is generated via the one or more hardware processors, for each image determined as a query image from the plurality of product images, wherein each of the plurality of positive images for the query image is similar to the query image in terms of a plurality of characteristics with at least one of a plurality of characteristics being different for the query image and the plurality of positive images. Further, a plurality of negative images is generated via the one or more hardware processors, for the query image. Further, a plurality of triplets are generated via the one or more hardware processors, wherein each of the plurality of triplets comprises a query image, a selected positive image from the plurality of positive images, a selected negative image from the plurality of negative images, wherein the plurality of triplets form a training data.

In yet another embodiment, the non-transitory computer readable medium configures the one or more hardware processors to generate the plurality of positive images using the following steps. Initially, a first set of the plurality of positive images is generated. Generating the plurality of positive images includes the following steps. Initially, a plurality of key points in the query image are identified. Further, a plurality of segments are generated by performing a segmentation of the query image based on a body part associated with each of the plurality of key points. Further, one or more variants of the query image are generated by exchanging color channels of two or more of the plurality of segments, wherein the generated one or more variants of the query image forms the first set of the plurality of positive images. Further, a second set of the plurality of positive images is generated. In this process, a plurality of color channels in the query image are extracted. Further, each of the plurality of color channels is divided to a plurality of slices. Further, color channel of one or more of the plurality of slices is altered. Further, a plurality of synthetic positive images are generated from the plurality of slices for which the color channels have been altered, wherein the plurality of synthetic positive images forms the second set of the plurality of positive images. Further, the first set of the plurality of positive images and the second set of the plurality of positive images are augmented to generate a final set of positive images.

In yet another embodiment, the non-transitory computer readable medium configures the one or more hardware processors to generate the plurality of negative images using the following steps. Initially, the plurality of product images are classified into a plurality of coarse class buckets. Further, the plurality of product images in the plurality of coarse class buckets are processed using a pre-trained deep learning model. Processing the plurality of product images using the pre-trained deep learning model includes the following steps. In this process, initially a long vector is formed for each of the plurality of product images, wherein each of a plurality of bits in the long vector belongs to a particular filter of a particular layer among a plurality of layers of the deep learning model. Further, a binary vector representation of each of the plurality of product images is generated based on value of the plurality of bits. Further, an exclusive bit in the binary vector representation of each of the plurality of product images is identified. Further, a combined binary vector is generated for each of the plurality of coarse class buckets, by merging the identified exclusive bit in the binary vector representation of each of the plurality of product images in each of the plurality of coarse class buckets. Further, a layer-wise filter index dictionary is generated using the combined binary vector for the plurality of coarse class buckets, wherein the layer-wise filter index dictionary holds information on a subset of the plurality of layers of the deep learning model, that have a significant role in distinguishing the plurality of images belonging to the plurality of coarse class buckets. Further, a distinguisher vector is generated for each of the plurality of product images, based on the layer-wise filter index dictionary. Further, a similarity score representing similarity of the plurality of images is determined in each of the plurality of coarse class buckets, based on the distinguisher vector for each of the plurality of product images, wherein, based on the determined similarity score, a plurality of the images from the plurality of coarse class buckets are identified as the plurality of negative images (in-class negative images).

In yet another embodiment, the non-transitory computer readable medium configures the one or more hardware processors to identify the plurality of images as the plurality of negative images, based on the determined similarity score, using the following steps. Initially, the similarity score of each of the plurality of images is compared with a threshold of similarity. Further, all images from the plurality of images, having value of the similarity score below the threshold of similarity, are identified as the plurality of negative images.

In yet another embodiment, the non-transitory computer readable medium configures the one or more hardware processors to use a deep learning model trained using the generated training data to perform a similarity search. In an embodiment, the non-transitory computer readable medium may configure the one or more hardware processors to use out-of-class images along with the in-class negative images, for training the deep learning model. In this process, a query image is collected as input. Further, the query image is processed using the deep learning model to obtain a query embedding. Further, similarity of the query image with a plurality of reference images is determined, based on the query embedding. Further, at least one recommendation of at least one reference that is most similar to the real-time query image, is generated, based on the determined similarity.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram depicting steps involved in the process of generating the training data building the deep learning model for apparel search, by the system of FIG. 1, according to some embodiments of the present disclosure.

FIG. 3 is a flow diagram depicting steps involved in the process of generating a plurality of positive images from each query image, for generating the training data building the deep learning model for apparel search, by the system of FIG. 1, in accordance with some embodiments of the present disclosure.

FIGS. 4A and 4B is a flow diagram depicting steps involved in the process of generating a plurality of negative images from each query image, for generating the training data building the deep learning model for apparel search, by the system of FIG. 1, according to some embodiments of the present disclosure.

FIG. 6 is a flow diagram depicting steps involved in the process of performing a similarity search using a deep learning model trained using the generated training data, by the system of FIG. 1, according to some embodiments of the present disclosure.

DETAILED DESCRIPTION

Figure 1:
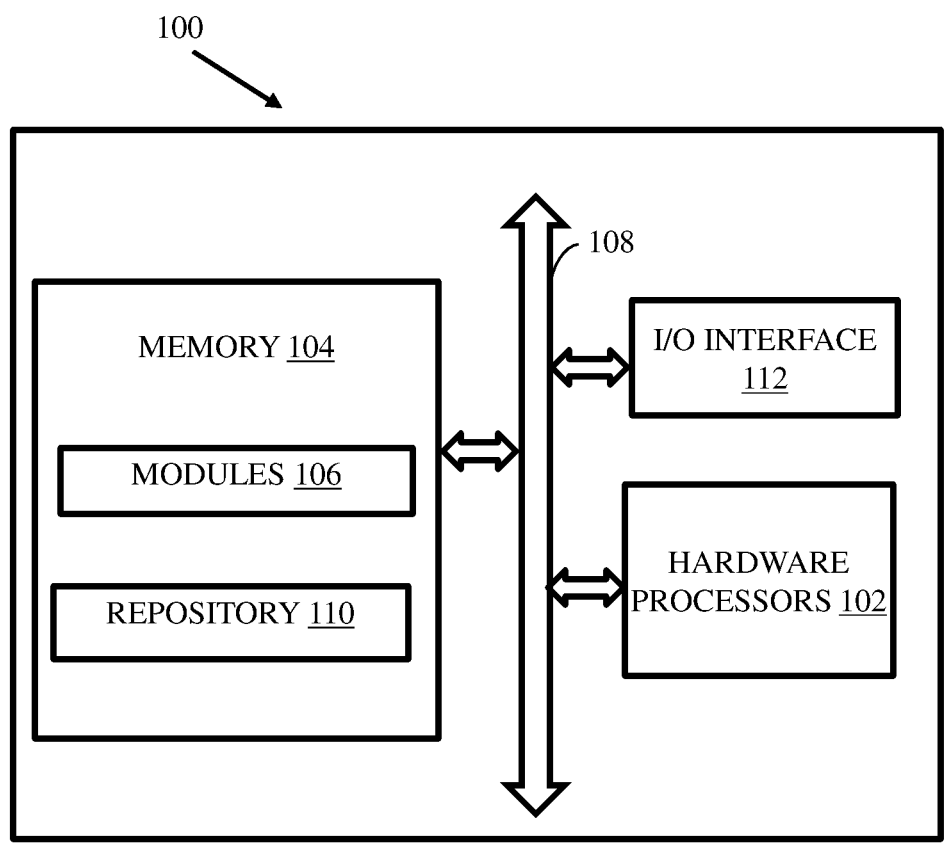
FIG. 1 illustrates an exemplary system for generating a training data for building a deep learning model for apparel search, according to some embodiments of the present disclosure.
Figure 4B:
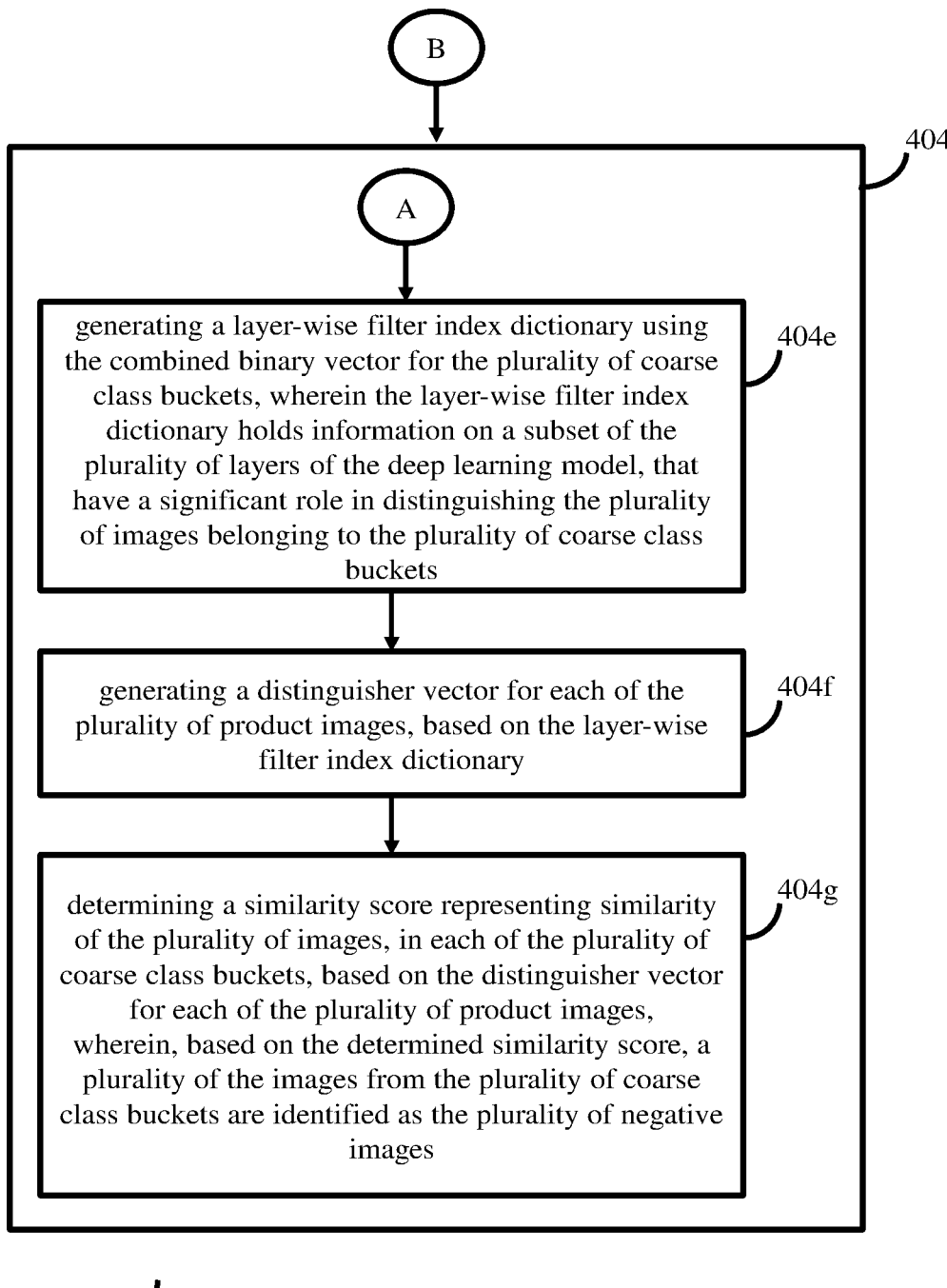
Figure 5:
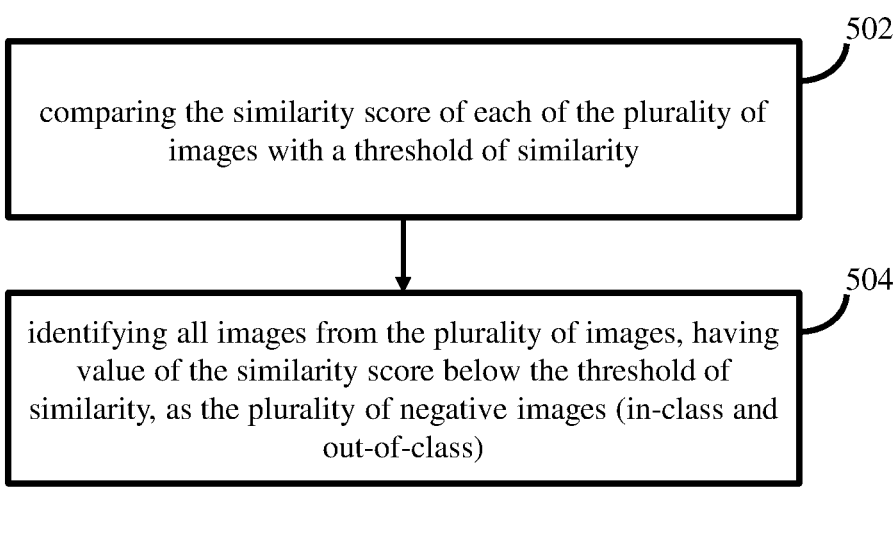
FIG. 5 is a flow diagram depicting steps involved in the process of generating the plurality of negative images, based on a determined similarity score, by the system of FIG. 1, according to some embodiments of the present disclosure.
Figure 7:
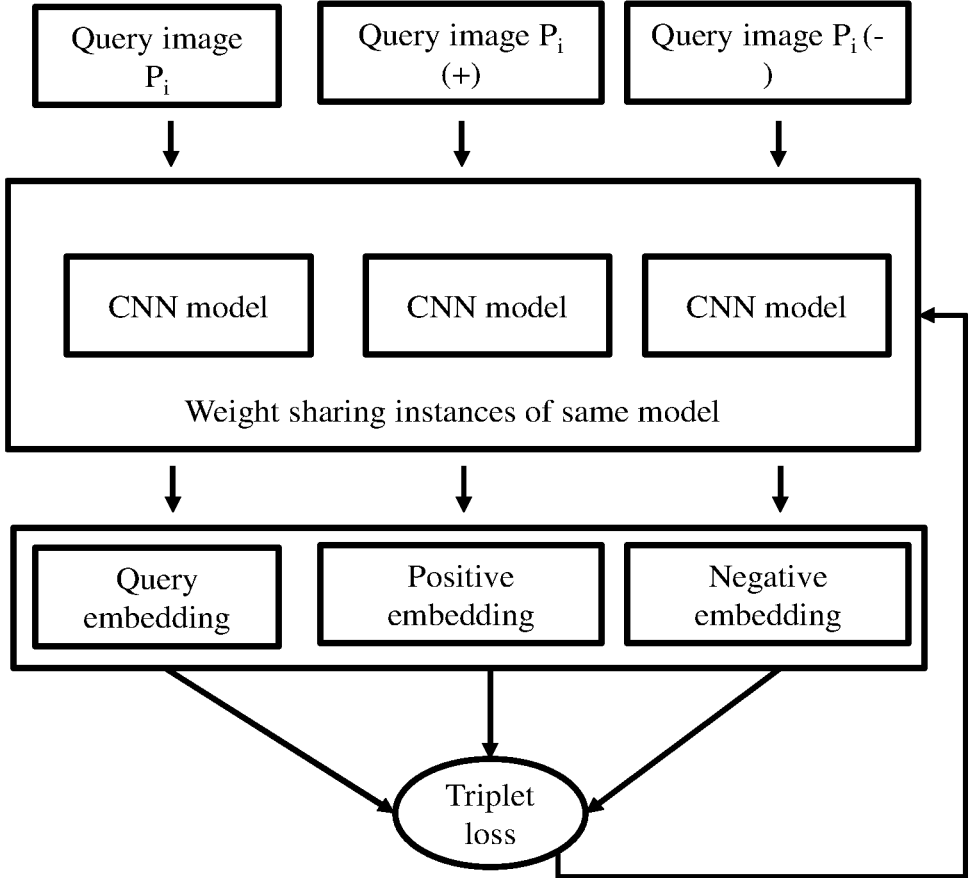
FIG. 7 depicts an example architecture of training of a deep learning model for apparel search, according to some embodiments of the present disclosure.
Figure 8A:
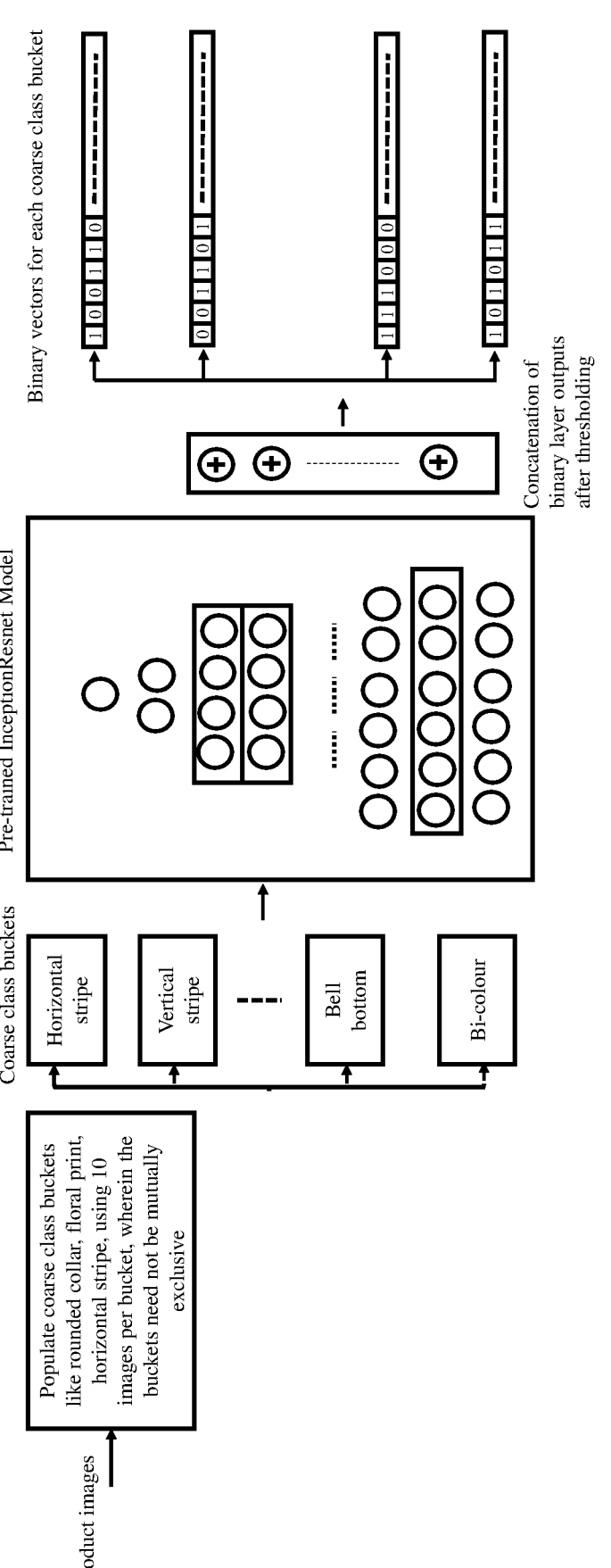
FIGS. 8A, 8B, and 8C depict example implementation of the system of FIG. 1 for the apparel search, and various steps in the method 200 being executed by the system of FIG. 1, according to some embodiments of the present disclosure.
Figure 8B:
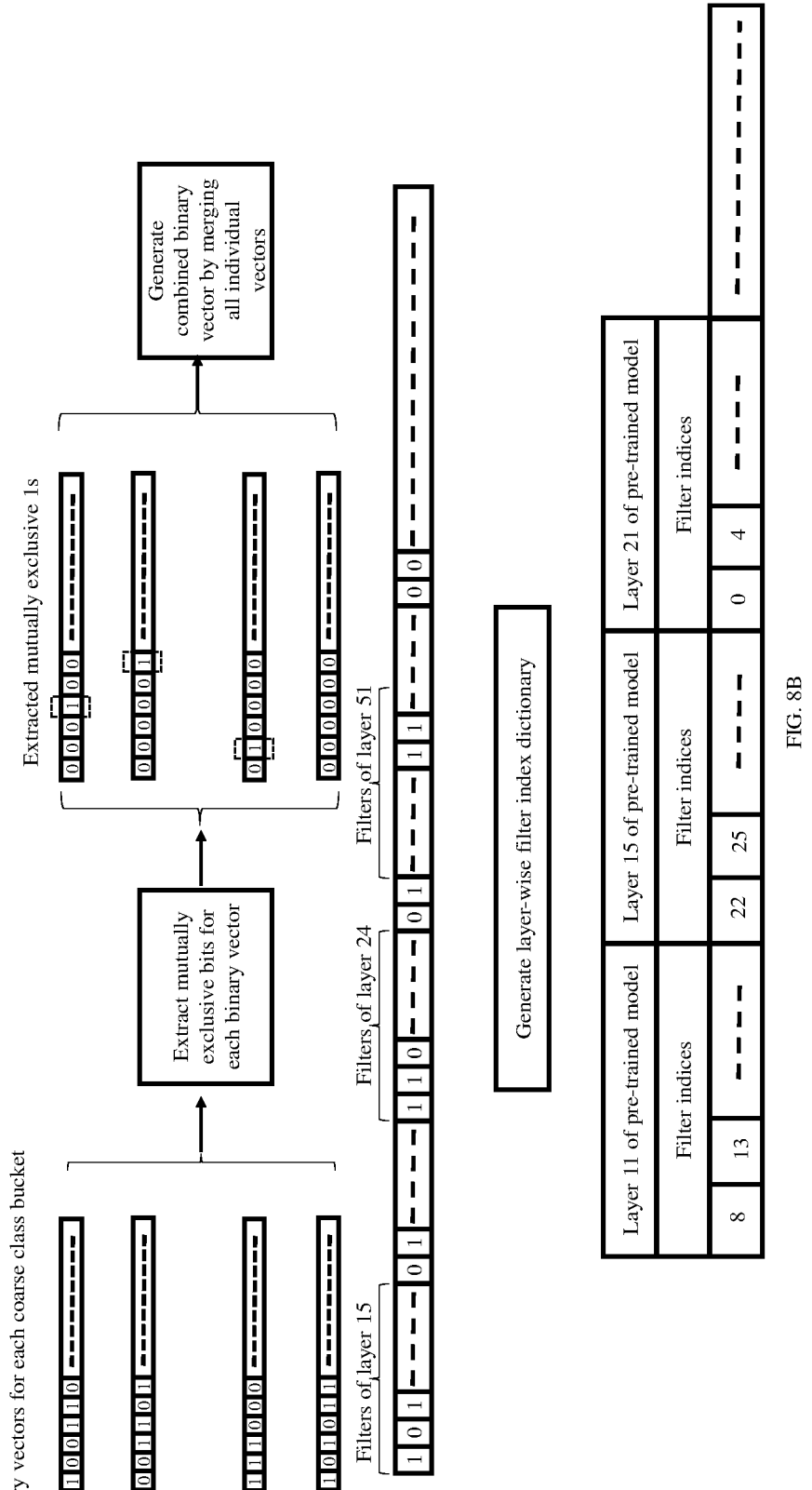
Figure 8C:
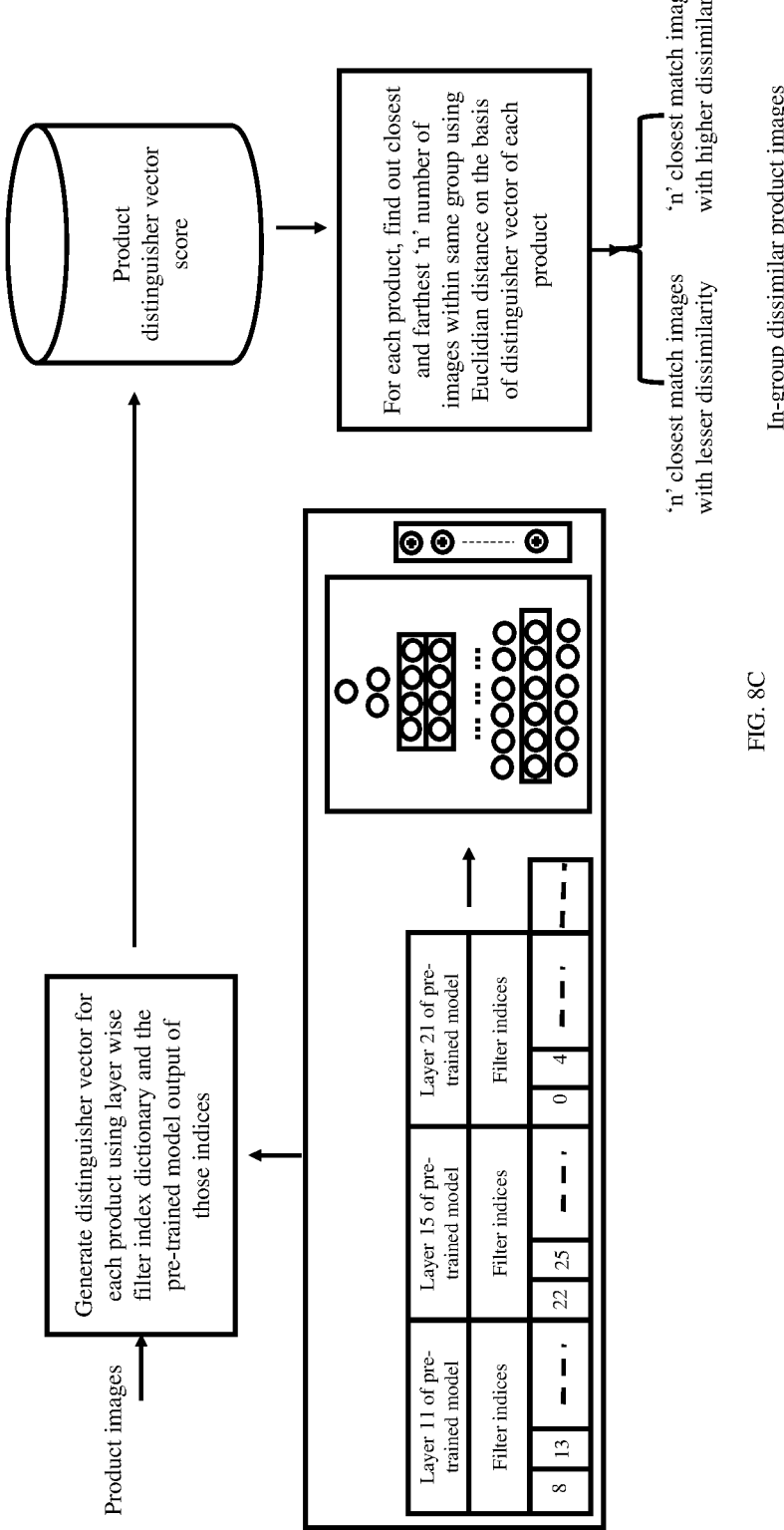

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The process of finding a similar item out of thousands of other items is a cumbersome and computationally heavy process. In order to build a deep learning model that can perform the similarity search, hundreds of training images per Stock Keeping Unit (SKU) are required. Due to shortage of training data, this approach fails to generate a deep learning model that can perform the similarity search in intended manner.

In order to address this challenge, the embodiments disclosed herein provide a method and system for generating a training data for building a deep learning model for apparel search, and a mechanism of performing the similarity search using the deep learning model. In this method, a plurality of product images is received via one or more hardware processors as input data. Further, a plurality of positive images is generated via the one or more hardware processors, for each image determined as a query image from the plurality of product images, wherein each of the plurality of positive images for the query image is similar to the query image in terms of a plurality of characteristics with at least one of a plurality of characteristics being different for the query image and the plurality of positive images. Further, a plurality of negative images is generated via the one or more hardware processors, for the query image. Further, a plurality of triplets are generated via the one or more hardware processors, wherein each of the plurality of triplets comprises a query image, a selected positive image from the plurality of positive images, a selected negative image from the plurality of negative images, wherein the plurality of triplets form a training data. Further, a deep learning model is generated using the training data. Further, the deep learning model is used for processing query images, which may or may not be real-time images. In this process, the query image is processed using the data model to obtain a query embedding. Further, similarity of the query image with a plurality of reference images is determined, based on the query embedding. Further, at least one recommendation of at least one reference that is most similar to the real-time query image, is generated, based on the determined similarity. It is to be noted that even though the synthetic positive image generation has been highlighted, the entire process of training data generation, deep learning model generation, and apparel search has been explained in connection with the synthetic positive image generation process.

Referring now to the drawings, and more particularly to FIG. 1 through FIG. 8C, where similar reference characters denote corresponding features consistently throughout the figures, there are shown preferred embodiments and these embodiments are described in the context of the following exemplary system and/or method.

FIG. 1 illustrates an exemplary system for generating a training data for building a deep learning model for apparel search, according to some embodiments of the present disclosure.

The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of similarity search of apparels, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the switching between hardware accelerators for the similarity search of apparels.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagrams in FIG. 2 through FIG. 6, and the examples depicted in FIG. 7 through FIG. 8C.

FIG. 2 is a flow diagram depicting steps involved in the process of generating the training data building the deep learning model for apparel search, by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of a method 200 of FIG. 2, a plurality of product images is received via one or more hardware processors as input data. The plurality of images may comprise one image from each of a plurality of SKUs. Each of the plurality of images may have certain characteristics, some of which may be unique an apparel captured in the images. For example, apparels in images from different SKUs may have different colors, designs (stripes, lines etc.).

Further, at step 204 of the method 200, the system 100 generates a plurality of positive images via the one or more hardware processors 102, for each image determined as a query image from the plurality of product images, wherein each of the plurality of positive images for the query image is similar to the query image in terms of a plurality of characteristics with at least one of a plurality of characteristics being different for the query image and the plurality of positive images. Steps involved in the process of generating the plurality of positive images are depicted in method 300 in FIG. 3.

At step 302 of the method 300, a first set of the plurality of positive images is generated for the query image. Steps involved in generating the first set of the plurality of positive images for the query image are depicted in steps 302$a$ through 302$c$. At step 302$a$, a plurality of key points in the query image are identified by the system 100. The key points maybe body parts such as but not limited to "neck", "left shoulder", "right shoulder", "left knee", "right knee", "left hand", and "right hand". Further, at step 302$b$, the system 100 generates a plurality of segments by performing a segmentation of the query image based on a body part associated with each of the plurality of key points. For example, if the image is of a shirt, the segments may include, but not limited to "collar (which is associated with the key point 'neck')", "sleeves (which are associated with the key points "left hand", and "right hand")" and so on. Further, at step 302$c$, the system 100 generates one or more variants of the query image by exchanging color channels of two or more of the plurality of segments, wherein the generated one or more variants of the query image forms the first set of the plurality of positive images.

At step 304 of the method 300, a second set of the plurality of positive images is generated. Steps involved in the process of generating the second set of the plurality of positive images are depicted in steps 304$a$ through 304$d$, and are explained hereafter. At step 304$a$, the system 100 extracts a plurality of color channels in the query image. In an embodiment, number of the color channels that are extracted by the system 100 maybe pre-defined or dynamically defined, for example, 3 color channels. Further, at step 304$b$, each of the plurality of color channels is divided to a plurality of slices. The system 100 may divide each of the plurality of color channels to the plurality of slices, based on pixel values, which is in 0 to 255 range. Similar to the color channels, the number of slices also maybe pre-defined. For example, consider that the number of slices is defined as 10. In this case, a total of 30 slices is obtained, i.e. from the 3 color channels. Further, at step 304$c$, color channel of one or more of the plurality of slices is altered/manipulated. In an embodiment, the one or more slices for which the color channels are altered, are randomly selected from the plurality of slices. The steps 304$b$ and 304$c$, i.e. the slicing and alter operations, causes all features other than most prominent visual features, to be noisy. Further, at step 304$d$, a plurality of synthetic positive images are generated from the plurality of slices for which the color channels have been altered, wherein the plurality of synthetic positive images forms the second set of the plurality of positive images. Further, at step 306 of the method 300, the first set of the plurality of positive images and the second set of the plurality of positive images are augmented to generate a final set of positive images.

Referring back to the method 200, at step 206 of the method 200, a plurality of negative images is generated via the one or more hardware processors 102, for the query image. Various steps in the process of generating the plurality of negative images are depicted in method 400 in FIGS. 4A and 4B, and are explained hereafter.

At step 402 of the method 400, the plurality of product images are classified into a plurality of coarse class buckets. The coarse class buckets maybe pre-defined. Some examples of the coarse class buckets are, but not limited to, "horizontal stripe", "vertical stripe", "pinstripe", "plaid", "checked", "half sleeve", "full sleeve", "angel sleeve", "bell sleeve", "rounded collar", and "v-neck". Based on one or more of the characteristics of the apparel in the query image, one or more matching coarse class buckets are identified, and accordingly the product images are classified. For example a "check shirt with rounded collar" can be placed in both "checked" and "rounded collar" buckets. Further, at step 404 of the method 400, the plurality of product images in the plurality of coarse class buckets are processed using a pre-trained deep learning model. The pre-trained deep learning model maybe any suitable deep learning model, such as but not limited to, InceptionResNetV2, InceptionV3, ResNet152V2, and so on. Processing the plurality of product images using the pre-trained deep learning model includes steps 404a through 404g.

At step 404a, a long vector is formed for each of the plurality of product images, wherein each of a plurality of bits in the long vector belongs to a particular filter of a particular layer among a plurality of layers of the deep learning model. Further, at step 404b, a binary vector representation of each of the plurality of product images is generated based on value of the plurality of bits. In order to generate the binary vector representation, the system 100 checks if at least one value of any particular filter output of the deep learning model is exceeding a pre-defined threshold (for example, threshold value is 0.8). If yes, then the system 100 sets the corresponding bit to 1, else to 0. This is repeated for all images of a Coarse Class Bucket, followed by a bit-wise-AND operation on the output vectors, which provides the "Binary vector" for the coarse class bucket. It means, a particular bit in the "Binary vector" for a bucket is 1, only if that particular bit is 1 for all the Images belonging to that bucket. In the example implementation scenario, this is depicted with reference to FIG. 8A. Further, at step 404c, the system 100 identifies an exclusive bit (i.e. a bit that is exclusively 1 for that particular coarse class bucket) in the binary vector representation of each of the plurality of product images. Further, at step 404d, the system 100 generates a combined binary vector for each of the plurality of coarse class buckets, by merging the identified exclusive bit in the binary vector representation of each of the plurality of product images in each of the plurality of coarse class buckets. Further, at step 404e, the system 100 generates a layer-wise filter index dictionary using the combined binary vector for the plurality of coarse class buckets, wherein the layer-wise filter index dictionary holds information on a subset of the plurality of layers of the deep learning model, that have a significant role in distinguishing the plurality of images belonging to the plurality of coarse class buckets. In the example implementation scenario, this is depicted with reference to FIG. 8B.

Further, at step 404f, the system 100 generates a distinguisher vector for each of the plurality of product images, based on the layer-wise filter index dictionary. Each bit of the "Distinguisher vector" holds a count of number of values above the set threshold. For example, if the size of a particular filter output is 35×35, and 15 values out of total 1225 (=35×35) output bits are above the threshold, then the corresponding bit in "Distinguisher vector" is set to 15.

Further, at step 404g, the system 100 determines a similarity score representing similarity of the plurality of images in each of the plurality of coarse class buckets, based on the distinguisher vector for each of the plurality of product images. At this step, the system 100 determines 'n' closest and farthest images for the query image, based on a computed Euclidean distance for each image pair. The calculated Euclidean distance may represent the similarity score. Based on the determined similarity score, a plurality of the images from the plurality of coarse class buckets are identified as the plurality of negative images, as depicted in method 500 in FIG. 5. In order to identify the plurality of images as the plurality of negative images, at step 502 of the method 500, the system 100 compares the similarity score of each of the plurality of images with a threshold of similarity. Further, at step 504 of the method 500, all images from the plurality of images, having value of the similarity score below the threshold of similarity, are identified as the plurality of negative images. In an embodiment, images having value of the similarity score exceeding the threshold of similarity maybe identified as the plurality of positive images. In the example implementation scenario, this is depicted with reference to FIG. 8C. In an embodiment, the plurality of negative images that are generated by the system 100 using the method 400 are in-class negative images, i.e. there is certain level of similarity with the query image.

Referring back to method 200, at step 208 of the method 200, the system 100 generates a plurality of triplets, wherein each of the plurality of triplets includes a query image, a selected positive image from the plurality of positive images, a selected negative image from the plurality of negative images. wherein the plurality of triplets form a training data. In an embodiment, selection of the positive image and the negative image for each of the plurality of triplets, from among the plurality of positive images and the plurality of negative images is randomly done by the system 100. In an embodiment, the random selection of the positive image and the negative image maybe governed by one or more conditions with respect to accuracy, computational expenses, and/or any other parameter.

The training data is then used to generate a deep learning model. The training of the deep learning model is explained with reference to an example architecture provided in FIG. 7. The deep learning model is trained by minimizing triplet loss evaluated for [query_image, positive_image, negative_image] triplets. In an embodiment, the system 100 maybe configured to use out-of-class images along with the in-class negative images, for training the deep learning model. The out-of-class images may lack similarity with the query image. Various steps in using the deep learning model for the similarity search are depicted in method 600 in FIG. 6, and are explained hereafter. At step 602 of the method 600, a query image is collected as input. Further, at step 604 of the method 600, the query image is processed using the deep learning model to obtain a query embedding. Further, at step 606 of the method 600, similarity of the query image with a plurality of reference images is determined, based on the query embedding. At this stage, Further, at step 608 of the method 600, at least one recommendation of at least one reference image that is most similar to the real-time query image, is generated, based on the determined similarity.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of similarity search of apparels. The embodiment, thus provides a mechanism to generate positive images and negative images from a query image, to generate a training data and in turn to generate a deep learning model. Moreover, the embodiments herein further provide a mechanism of performing the similarity search using the deep learning model.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, via one or more hardware processors, a plurality of product images as input data;

generating, via the one or more hardware processors, a plurality of positive images for each image determined as a query image from the plurality of product images, wherein each of the plurality of positive images for the query image is similar to the query image in terms of a plurality of characteristics with at least one of a plurality of characteristics being different for the query image and the plurality of positive images;

generating, via the one or more hardware processors, a plurality of negative images for the query image, wherein generating the plurality of negative images comprises:

classifying the plurality of product images into a plurality of coarse class buckets by identifying one or more matching coarse class buckets based on one or more of the characteristics of the apparel in the query image; and processing the plurality of product images in the plurality of coarse class buckets using a pre-trained deep learning model, comprising:

forming a long vector for each of the plurality of product images, wherein each of a plurality of bits in the long vector belongs to a particular filter of a particular layer among a plurality of layers of the deep learning model;

generating a binary vector representation of each of the plurality of product images, based on value of the plurality of bits, wherein the binary vector representation is generated by checking if at least one value of any particular filter output of the deep learning model is exceeding a pre-defined threshold and if yes, then sets the corresponding bit to 1, else to 0, repeating for all images of a coarse class bucket, followed by a bit-wise-AND operation on the output vectors, identifying an exclusive bit in the binary vector representation of each of the plurality of product images;

generating a combined binary vector for each of the plurality of coarse class buckets, by merging the identified exclusive bit in the binary vector representation of each of the plurality of product images in each of the plurality of coarse class buckets;

generating a layer-wise filter index dictionary using the combined binary vector for the plurality of coarse class buckets, wherein the layer-wise filter index dictionary holds information on a subset of the plurality of layers of the deep learning model, that have a significant role in distinguishing the plurality of images belonging to the plurality of coarse class buckets;

generating a distinguisher vector for each of the plurality of product images, based on the layer-wise filter index dictionary, wherein each bit of the distinguisher vector holds a count of number of values above the set threshold; and determining a similarity score representing similarity of the plurality of images, in each of the plurality of coarse class buckets, based on the distinguisher vector for each of the plurality of product images, wherein the similarity score is based on a computed Euclidean distance for each image pair and determining closest and farthest images for the query image based on a computed Euclidean distance, wherein, based on the determined similarity score, a plurality of the images from the plurality of coarse class buckets are identified as the plurality of negative images; and generating a plurality of triplets, via the one or more hardware processors, wherein each of the plurality of triplets comprises a query image, a selected positive image from the plurality of positive images, a selected negative image from the plurality of negative images, wherein the plurality of triplets form a training data.

2. The method of claim 1, wherein generating the plurality of positive images comprises:

generating a first set of the plurality of positive images, comprising:

identifying a plurality of key points in the query image;

generating a plurality of segments by performing a segmentation of the query image based on a body part associated with each of the plurality of key points; and generating one or more variants of the query image by exchanging color channels of two or more of the plurality of segments, wherein the generated one or more variants of the query image forms the first set of the plurality of positive images;

generating a second set of the plurality of positive images, comprising:

extracting a plurality of color channels in the query image;

dividing each of the plurality of color channels to a plurality of slices based on pixel values;

altering color channel of one or more of the plurality of slices; and generating a plurality of synthetic positive images from the plurality of slices for which the color channels have been altered, wherein the plurality of synthetic positive images forms the second set of the plurality of positive images; and augmenting the first set of the plurality of positive images and the second set of the plurality of positive images to generate a final set of positive images.

3. The method of claim 1, wherein identifying the plurality of images as the plurality of negative images, based on the determined similarity score, comprises:

comparing the similarity score of each of the plurality of images with a threshold of similarity; and identifying all images from the plurality of images, having value of the similarity score below the threshold of similarity, as the plurality of negative images, wherein the plurality of negative images are in-class negative images with certain level of similarity with the query image.

4. The method of claim 3, wherein all of the plurality of images having the similarity score exceeding the threshold of similarity are identified as the plurality of positive images.

5. The method of claim 1, wherein a deep learning model trained using the generated training data is used to perform a similarity search, comprising:

collecting a query image as input;

processing the query image using the deep learning model to obtain a query embedding;

determining similarity of the query image with a plurality of reference images, based on the query embedding; and generating at least one recommendation of at least one reference that is most similar to the real-time query image, based on the determined similarity.

6. A system, comprising:

one or more hardware processors;

a communication interface; and a memory storing a plurality of instructions, wherein the plurality of instructions when executed, cause the one or more hardware processors to:

receive a plurality of product images as input data;

generate a plurality of positive images for each image determined as a query image from the plurality of product images, wherein each of the plurality of positive images for the query image is similar to the query image in terms of a plurality of characteristics with at least one of a plurality of characteristics being different for the query image and the plurality of positive images;

generate a plurality of negative images for the query image, wherein generating the plurality of negative images comprises:

classifying the plurality of product images into a plurality of coarse class buckets by identifying one or more matching coarse class buckets based on one or more of the characteristics of the apparel in the query image; and processing the plurality of product images in the plurality of coarse class buckets using a pre-trained deep learning model, comprising:

forming a long vector for each of the plurality of product images, wherein each of a plurality of bits in the long vector belongs to a particular filter of a particular layer among a plurality of layers of the deep learning model;

generating a binary vector representation of each of the plurality of product images, based on value of the plurality of bits, wherein the binary vector representation is generated by checking if at least one value of any particular filter output of the deep learning model is exceeding a pre-defined threshold and if yes, then sets the corresponding bit to 1, else to 0, repeating for all images of a coarse class bucket, followed by a bit-wise-AND operation on the output vectors, identifying an exclusive bit in the binary vector representation of each of the plurality of product images;

generating a combined binary vector for each of the plurality of coarse class buckets, by merging the identified exclusive bit in the binary vector representation of each of the plurality of product images in each of the plurality of coarse class buckets;

generating a layer-wise filter index dictionary using the combined binary vector for the plurality of coarse class buckets, wherein the layer-wise filter index dictionary holds information on a subset of the plurality of layers of the deep learning model, that have a significant role in distinguishing the plurality of images belonging to the plurality of coarse class buckets;

generating a distinguisher vector for each of the plurality of product images, based on the layer-wise filter index dictionary, wherein each bit of the distinguisher vector holds a count of number of values above the set threshold; and determining a similarity score representing similarity of the plurality of images, in each of the plurality of coarse class buckets, based on the distinguisher vector for each of the plurality of product images, wherein the similarity score is based on a computed Euclidean distance for each image pair and determining closest and farthest images for the query image based on a computed Euclidean distance, wherein, based on the determined similarity score, a plurality of the images from the plurality of coarse class buckets are identified as the plurality of negative images; and generate a plurality of triplets, wherein each of the plurality of triplets comprises a query image, a selected positive image from the plurality of positive images, a selected negative image from the plurality of negative images, wherein the plurality of triplets form a training data.

7. The system of claim 6, wherein the one or more hardware processors are configured to generate the plurality of positive images by:

generating a first set of the plurality of positive images, comprising:

identifying a plurality of key points in the query image;

generating a plurality of segments by performing a segmentation of the query image based on a body part associated with each of the plurality of key points; and generating one or more variants of the query image by exchanging color channels of two or more of the plurality of segments; and generating a second set of the plurality of positive images, comprising:

extracting a plurality of color channels in the query image;

dividing each of the plurality of color channels to a plurality of slices based on pixel values;

altering color channel of one or more of the plurality of slices; and generating a plurality of synthetic positive images from the plurality of slices for which the color channels have been altered, wherein the plurality of synthetic positive images forms the second set of the plurality of positive images.

8. The system of claim 6, wherein the one or more hardware processors are configured to identify the plurality of images as the plurality of negative images, based on the determined similarity score, by:

comparing the similarity score of each of the plurality of images with a threshold of similarity; and identifying all images from the plurality of images, having value of the similarity score below the threshold of similarity, as the plurality of negative images, wherein the plurality of negative images are in-class negative images with certain level of similarity with the query image.

9. The system of claim 8, wherein the one or more hardware processors are configured to identify all of the plurality of images having the similarity score exceeding the threshold of similarity as the plurality of positive images.

10. The system of claim 6, wherein the one or more hardware processors are configured to use a deep learning model trained using the generated training data, to perform a similarity search, by:

collecting a query image as input;

processing the query image using the deep learning model to obtain a query embedding;

determining similarity of the query image with a plurality of reference images, based on the query embedding; and generating at least one recommendation of at least one reference that is most similar to the real-time query image, based on the determined similarity.

11. One or more non-transitory machine-readable information storage mediums comprising one or more instructions which when executed by one or more hardware processors cause:

receiving a plurality of product images as input data;

generating a plurality of positive images for each image determined as a query image from the plurality of product images, wherein each of the plurality of positive images for the query image is similar to the query image in terms of a plurality of characteristics with at least one of a plurality of characteristics being different for the query image and the plurality of positive images;

generating a plurality of negative images for the query image, wherein generating the plurality of negative images comprises:

classifying the plurality of product images into a plurality of coarse class buckets by identifying one or more matching coarse class buckets based on one or more of the characteristics of the apparel in the query image; and processing the plurality of product images in the plurality of coarse class buckets using a pre-trained deep learning model, comprising:

forming a long vector for each of the plurality of product images, wherein each of a plurality of bits in the long vector belongs to a particular filter of a particular layer among a plurality of layers of the deep learning model;

generating a binary vector representation of each of the plurality of product images, based on value of the plurality of bits, wherein the binary vector representation is generated by checking if at least one value of any particular filter output of the deep learning model is exceeding a pre-defined threshold and if yes, then sets the corresponding bit to 1, else to 0, repeating for all images of a coarse class bucket, followed by a bit-wise-AND operation on the output vectors, identifying an exclusive bit in the binary vector representation of each of the plurality of product images;

generating a combined binary vector for each of the plurality of coarse class buckets, by merging the identified exclusive bit in the binary vector representation of each of the plurality of product images in each of the plurality of coarse class buckets;

generating a layer-wise filter index dictionary using the combined binary vector for the plurality of coarse class buckets, wherein the layer-wise filter index dictionary holds information on a subset of the plurality of layers of the deep learning model, that have a significant role in distinguishing the plurality of images belonging to the plurality of coarse class buckets;

generating a distinguisher vector for each of the plurality of product images, based on the layer-wise filter index dictionary, wherein each bit of the distinguisher vector holds a count of number of values above the set threshold; and determining a similarity score representing similarity of the plurality of images, in each of the plurality of coarse class buckets, based on the distinguisher vector for each of the plurality of product images, wherein the similarity score is based on a computed Euclidean distance for each image pair and determining closest and farthest images for the query image based on a computed Euclidean distance, wherein, based on the determined similarity score, a plurality of the images from the plurality of coarse class buckets are identified as the plurality of negative images; and generating a plurality of triplets, wherein each of the plurality of triplets comprises a query image, a selected positive image from the plurality of positive images, a selected negative image from the plurality of negative images, wherein the plurality of triplets form a training data.

12. The one or more non-transitory machine-readable information storage mediums of claim 11, wherein generating the plurality of positive images comprises:

generating a first set of the plurality of positive images, comprising:

identifying a plurality of key points in the query image;

generating a plurality of segments by performing a segmentation of the query image based on a body part associated with each of the plurality of key points; and generating one or more variants of the query image by exchanging color channels of two or more of the plurality of segments, wherein the generated one or more variants of the query image forms the first set of the plurality of positive images;

generating a second set of the plurality of positive images, comprising:

extracting a plurality of color channels in the query image;

dividing each of the plurality of color channels to a plurality of slices based on pixel values;

altering color channel of one or more of the plurality of slices; and generating a plurality of synthetic positive images from the plurality of slices for which the color channels have been altered, wherein the plurality of synthetic positive images forms the second set of the plurality of positive images; and augmenting the first set of the plurality of positive images and the second set of the plurality of positive images to generate a final set of positive images.

13. The one or more non-transitory machine-readable information storage mediums of claim 11, wherein identifying the plurality of images as the plurality of negative images, based on the determined similarity score, comprises:

comparing the similarity score of each of the plurality of images with a threshold of similarity; and identifying all images from the plurality of images, having value of the similarity score below the threshold of similarity, as the plurality of negative images, wherein the plurality of negative images are in-class negative images with certain level of similarity with the query image.

14. The one or more non-transitory machine-readable information storage mediums of claim 13, wherein all of the plurality of images having the similarity score exceeding the threshold of similarity are identified as the plurality of positive images.

15. The one or more non-transitory machine-readable information storage mediums of claim 11, wherein the one or more instructions which when executed by the one or more hardware processors cause:

collecting a query image as input;

processing the query image using the deep learning model to obtain a query embedding;

determining similarity of the query image with a plurality of reference images, based on the query embedding; and generating at least one recommendation of at least one reference that is most similar to the real-time query image, based on the determined similarity.

16. The method of claim 1, wherein the plurality of product images comprises one image from each of a plurality of SKUs with certain characteristics including different colors, different designs.

* * * * *